(12) United States Patent
Takahashi et al.

(10) Patent No.: US 12,388,111 B2
(45) Date of Patent: Aug. 12, 2025

(54) NONAQUEOUS ELECTROLYTE SECONDARY BATTERY POSITIVE ELECTRODE ACTIVE MATERIAL AND METHOD FOR MANUFACTURING SAME, AND NONAQUEOUS ELECTROLYTE SECONDARY BATTERY

(71) Applicant: SUMITOMO METAL MINING CO., LTD., Tokyo (JP)

(72) Inventors: Tatsuya Takahashi, Niihama (JP); Ryosuke Okamoto, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 603 days.

(21) Appl. No.: 17/464,156

(22) Filed: Sep. 1, 2021

(65) Prior Publication Data

US 2021/0399330 A1 Dec. 23, 2021

Related U.S. Application Data

(62) Division of application No. 15/752,989, filed as application No. PCT/JP2016/074398 on Aug. 22, 2016, now abandoned.

(30) Foreign Application Priority Data

Aug. 24, 2015 (JP) .................................. 2015-165246

(51) Int. Cl.
*H01M 10/052* (2010.01)
*C01G 53/00* (2025.01)
(Continued)

(52) U.S. Cl.
CPC .......... *H01M 10/052* (2013.01); *C01G 53/00* (2013.01); *C01G 53/54* (2013.01); *C01G 53/82* (2025.01);
(Continued)

(58) Field of Classification Search
CPC ......... H01M 10/052; H01M 2004/027; H01M 2004/028; H01M 4/1391; H01M 4/505;
(Continued)

(56) References Cited

U.S. PATENT DOCUMENTS 5,631,104 A 5/1997 Zhong et al.
2002/0106566 A1 8/2002 Nemoto et al.
(Continued)

FOREIGN PATENT DOCUMENTS

CN 102969498 A 3/2013
DE 19957313 A1 * 6/2000 ......... C01G 45/1242
(Continued)

OTHER PUBLICATIONS

International Search Report mailed Nov. 22, 2016, issued for PCT/JP2016/074398.

*Primary Examiner* — Allison Bourke
*Assistant Examiner* — Robert Gene West
(74) *Attorney, Agent, or Firm* — Troutman Pepper Locke LLP; James E. Armstrong, IV; Nicholas J. DiCeglie, Jr.

(57) ABSTRACT

Provided are: a nonaqueous electrolyte secondary battery positive electrode active material that has high crystallinity, that causes less amount of Mn deposition on a negative electrode, and that can form a secondary battery having excellent cycle characteristics; and a nonaqueous electrolyte secondary battery using the nonaqueous electrolyte secondary battery positive electrode active material. The nonaqueous electrolyte secondary battery positive electrode active material according to the present invention is formed of a lithium-manganese-nickel complex oxide including a spinel-type crystal structure, wherein the lithium-manganese-nickel complex oxide has a crystallite diameter not smaller than 1000 Å and is formed of primary particles that have a polyhedron shape having more than eight surfaces. The
(Continued)

proportion of ungrown particles not having the polyhedron shape of the primary particles in the lithium-manganese-nickel complex oxide is preferably not higher than 5%.

7 Claims, 8 Drawing Sheets

(51) Int. Cl.
*C01G 53/54* (2025.01)
*C01G 53/82* (2025.01)
*H01M 4/02* (2006.01)
*H01M 4/1391* (2010.01)
*H01M 4/505* (2010.01)
*H01M 4/525* (2010.01)

(52) U.S. Cl.
CPC .......... *H01M 4/1391* (2013.01); *H01M 4/505* (2013.01); *H01M 4/525* (2013.01); *C01P 2002/50* (2013.01); *C01P 2002/52* (2013.01); *C01P 2002/72* (2013.01); *C01P 2004/03* (2013.01); *H01M 2004/027* (2013.01); *H01M 2004/028* (2013.01); *H01M 2300/0017* (2013.01)

(58) Field of Classification Search
CPC .......... H01M 4/525; H01M 2300/0017; C01G 53/006; C01G 53/54; C01G 53/00; C01P 2002/50; C01P 2002/52; C01P 2002/72; C01P 2004/03
USPC ........................................... 429/209
See application file for complete search history.

(56) References Cited

U.S. PATENT DOCUMENTS

| | | | | |
|---|---|---|---|---|
| 2002/0192148 A1* | 12/2002 | Kweon | ............... | C01G 53/54 |
| | | | | 429/231.95 |
| 2008/0090151 A1* | 4/2008 | Hosoya | ............... | H01M 4/364 |
| | | | | 429/223 |
| 2010/0330429 A1* | 12/2010 | Yura | ............... | H01M 10/052 |
| | | | | 252/182.1 |
| 2011/0297876 A1 | 12/2011 | Masukuni et al. | | |
| 2013/0337330 A1 | 12/2013 | Taniguchi et al. | | |
| 2015/0188134 A1 | 7/2015 | Kameyama et al. | | |
| 2017/0331106 A1 | 11/2017 | Koga et al. | | |

FOREIGN PATENT DOCUMENTS

| | | | | |
|---|---|---|---|---|
| EP | 2520547 A1 * | 11/2012 | ............ | B82Y 30/00 |
| JP | 06-076824 A | 3/1994 | | |
| JP | 07-073883 A | 3/1995 | | |
| JP | 07-230802 A | 8/1995 | | |
| JP | 07-245106 A | 9/1995 | | |
| JP | 09-147867 A | 6/1997 | | |
| JP | 11-073962 A | 3/1999 | | |
| JP | 2000-203842 A | 7/2000 | | |
| JP | 2006-036545 A | 2/2006 | | |
| JP | 2007-039266 A | 2/2007 | | |
| JP | 2010-192428 A | 9/2010 | | |
| JP | 2013-082581 A | 5/2013 | | |
| JP | 2013-222502 A | 10/2013 | | |
| JP | 2013-222503 A | 10/2013 | | |
| JP | 2011204573 A1 * | 8/2014 | | |
| JP | 2014-238976 A | 12/2014 | | |
| KR | 20130085348 A * | 7/2013 | | |

* cited by examiner

NONAQUEOUS ELECTROLYTE SECONDARY BATTERY POSITIVE ELECTRODE ACTIVE MATERIAL AND METHOD FOR MANUFACTURING SAME, AND NONAQUEOUS ELECTROLYTE SECONDARY BATTERY

TECHNICAL FIELD

The present invention relates to a nonaqueous electrolyte secondary battery positive electrode active material, a method for manufacturing the same, and a nonaqueous electrolyte secondary battery, more specifically, it relates to a nonaqueous electrolyte secondary battery positive electrode active material having a spinel-type crystal structure and an expression potential of 4.7 V or more and a method for manufacturing the same, and a nonaqueous electrolyte secondary battery using the positive electrode active material.

BACKGROUND ART

In recent years, there is an increasing demand for small and lightweight secondary batteries having a high energy density along with the spread of portable devices such as cellular phones and laptop personal computers. As such a secondary battery, there is a nonaqueous electrolytic solution type lithium ion secondary battery, the research and development thereof has been actively carried out, and it has been attempted to put the battery to practical use. Such a lithium ion secondary battery includes a positive electrode containing a lithium-containing complex oxide as an active material, a negative electrode containing a material capable of occluding and releasing lithium such as lithium, a lithium alloy, a metal oxide, or carbon as an active material, and a separator containing a nonaqueous electrolytic solution or a solid electrolyte as main constituents.

Examples of the material to be investigated as a positive electrode active material among these main constituents may include lithium-cobalt complex oxide ($LiCoO_2$), lithium-nickel complex oxide ($LiNiO_2$), and lithium-manganese complex oxide ($LiMn_2O_4$). In particular, a great number of batteries using lithium-cobalt complex oxide in the positive electrode have been so far developed to obtain excellent initial capacity characteristics and cycle characteristics, various results have already been obtained, and the batteries have been put to practical use.

However, in a lithium ion secondary battery which uses lithium-cobalt complex oxide in the positive electrode and is currently practically used, the cobalt source to be a starting material of the lithium-cobalt complex oxide is present in a small amount and expensive as a resource and an alternative material which is more inexpensive and can achieve a higher energy density than cobalt is demanded.

Hence, as a nonaqueous electrolyte secondary battery positive electrode active material, a lithium-manganese oxide-based material having a spinel-type crystal structure is attracting attention instead of $LiCoO_2$. Examples of this lithium-manganese oxide having a spinel-type structure may include $Li_2Mn_4O_9$, $Li_4Mn_5O_{12}$, and $LiMn_2O_4$. Among these, $LiMn_2O_4$ is particularly actively researched since it can charge and discharge in the 4 V region with respect to Li (lithium) potential (for example, Patent Documents 1 to 4 and the like).

Meanwhile, in order to achieve a high energy density of the battery, it is one method to use a positive electrode active material having a high potential, but a high voltage of 300 V or more is required as a power source for electric vehicle. The development of a positive electrode active material which operates at a higher voltage than that of spinel-type lithium-manganese oxide is being carried out based on such a background.

It is also investigated to increase the voltage of the spinel-type lithium-manganese oxide for the number of batteries used. For example, in Patent Document 5 and Patent Document 6, it has been confirmed that an operating voltage of 4.5 V or more in terms of metal lithium potential is obtained in a battery using lithium-manganese complex oxide in which the manganese site is substituted with nickel.

As one of such complex oxide materials, spinel-type lithium-manganese-nickel complex oxide is a material attracting attention since it is known to stably express a high voltage of about 4.75 V. However, there is a problem that the battery capacity decreases as such a positive electrode active material which has a spinel-type structure and operates at a high voltage is repeatedly charged and discharged, and thus the positive electrode active material has not been put to practical use despite attracting wide attention from the researchers and developers.

One of the factors of a decrease in battery capacity is the decomposition of electrolytic solution at the time of charging due to a high voltage. The decomposition of electrolytic solution is an irreversible reaction, and thus the electrolytic solution which is the Li ion carrier between the positive electrode and the negative electrode gradually decreases and the capacity decreases every time charging and discharging is repeated. In addition, the decomposed electrolytic solution generates gas mainly containing hydrogen and the like as a main component and also causes troubles such as swelling of the battery.

Another factor of a decrease in battery capacity is dissolution of Mn. The dissolution of Mn is also observed, for example, in spinel-type lithium-manganese oxide which does not contain nickel, and it is not a problem peculiar to spinel-type lithium-manganese-nickel oxide which is a material for achieving a high voltage. It is considered that this dissolution phenomenon hinders the cell reaction at the negative electrode and decreases the capacity as Mn dissolved out from the positive electrode is deposited on the negative electrode particularly in the case of using a carbon-based material in the negative electrode.

Such things are all mainly caused by the side reaction occurring at the interface between the positive electrode active material and the electrolytic solution, and it is attempted to improve the problems by controlling the surface state of spinel-type lithium-manganese-nickel complex oxide.

For example, in Patent Document 7, it is proposed to decrease the dissolution of Mn by forming a halide layer on the surface of spinel-type lithium-manganese oxide. However, it is not industrially preferable since halogen elements such as fluorine and chlorine evaporate at the time of calcination and deteriorate the interior of the kiln.

In addition, the surface state is modified by covering the particle surface of lithium-manganese-nickel complex oxide with a metal oxide containing at least one or more metal elements selected from among Mg, Al, Ti, Zr, and Zn in Patent Document 8. However, it requires a technique to uniformly conduct such a covering treatment on each particle and it is impossible to sufficiently improve the cycle characteristics and decrease the dissolution unless each particle is uniformly covered.

The decomposition of electrolytic solution and dissolution of Mn as described above occur at the interface between spinel-type lithium-manganese-nickel complex oxide and the electrolytic solution, and it is thus the simplest method for improving the decomposition of electrolytic solution and dissolution of Mn to increase the particle diameter of particles and decrease the specific surface area thereof. It is generally known that, for example, the temperature in the calcination step in the fabrication of spinel-type lithium-manganese-nickel complex oxide particles is set to a high temperature and the sintering rate is increased in order to decrease the specific surface area.

By the investigations of the inventors of the present invention, it has been found that it is required to decrease the specific surface area of the particles to be obtained to from 0.1 to 0.3 m$^2$/g by conducting the calcination at a temperature of higher than 1000° C. in order to obtain a sample having sufficiently high cycle characteristics and less deposition of Mn on the negative electrode. However, such temperature setting requires extremely great energy consumption, and it is industrially difficult to put the method to practical use.

As described above, there are a large number of problems in order to enhance the cycle characteristics of spinel-type lithium-manganese-nickel complex oxide and to suppress the dissolution on the basis of surface modification, and the development of a positive electrode active material for a nonaqueous electrolyte secondary battery having excellent cycle characteristics has been desired.

Patent Document 1: Japanese Unexamined Patent Application, Publication No. H06-76824
Patent Document 2: Japanese Unexamined Patent Application, Publication No. H07-73883
Patent Document 3: Japanese Unexamined Patent Application, Publication No. H07-230802
Patent Document 4: Japanese Unexamined Patent Application, Publication No. H07-245106
Patent Document 5: Japanese Unexamined Patent Application, Publication No. H09-147867
Patent Document 6: Japanese Unexamined Patent Application, Publication No. H11-73962
Patent Document 7: Japanese Unexamined Patent Application, Publication No. 2000-203842
Patent Document 8: Japanese Unexamined Patent Application, Publication No. 2006-36545

DISCLOSURE OF THE INVENTION

Problems to be Solved by the Invention

In view of such problems, an object of the present invention is to provide a nonaqueous electrolyte secondary battery positive electrode active material which can form a secondary battery having excellent cycle characteristics, has a small amount of Mn deposited on the negative electrode, and has high crystallinity and a nonaqueous electrolyte secondary battery using the same.

Means for Solving the Problems

The inventors of the present invention have carried out intensive investigations to achieve the above-mentioned object. As a result, it has been found that lithium-manganese-nickel complex oxide having a low proportion of ungrown particles and high crystallinity is obtained by mixing manganese-nickel complex hydroxide obtained by reactive crystallization using manganese chloride and nickel chloride with a lithium compound, calcining the mixture at an arbitrary temperature, and further recalcining the calcined resultant. Moreover, it has been found that excellent cycle characteristics are obtained by forming a secondary battery by using the lithium-manganese-nickel complex oxide as a positive electrode active material, whereby the present invention has been completed. Specifically, the present invention provides the following.

(1) The present invention is a nonaqueous electrolyte secondary battery positive electrode active material which is formed of lithium-manganese-nickel complex oxide including a spinel-type crystal structure and in which the lithium-manganese-nickel complex oxide is formed of primary particles having a polyhedral shape having more than eight faces and has a crystallite diameter of 1000 Å or more.

(2) In addition, the present invention is the nonaqueous electrolyte secondary battery positive electrode active material according to (1), in which an atomic ratio among Li, Mn, Ni, and element M in the lithium-manganese-nickel complex oxide has a relationship of Li:Mn:Ni:M=1+x:2−y−x−z:y:z (where 0≤x≤0.2, 0.4≤y≤0.6, 0≤z≤0.2, and M is one or more selected from the group consisting of Mg, Al, Si, Ti, Cr, Fe, Co, Cu, and Zn).

(3) In addition, the present invention is the nonaqueous electrolyte secondary battery positive electrode active material according to (1) or (2), in which a proportion of ungrown particles which are contained in the lithium-manganese-nickel complex oxide and of which primary particles do not have a polyhedral shape is 5% or less.

(4) In addition, the present invention is a method for manufacturing a nonaqueous electrolyte secondary battery positive electrode active material formed of lithium-manganese-nickel complex oxide, which includes a crystallization step of crystallizing manganese-nickel complex hydroxide from a mixed solution of manganese chloride and nickel chloride, a calcination step of mixing the manganese-nickel complex hydroxide obtained and a lithium compound and calcining the mixture at 800° C. or higher and 1000° C. or lower to obtain lithium-manganese-nickel complex oxide, and a recalcination step of recalcining the lithium-manganese-nickel complex oxide obtained at 500° C. or higher and 800° C. or lower for 5 hours or longer and 40 hours or shorter.

(5) In addition, the present invention is a nonaqueous electrolyte secondary battery including the nonaqueous electrolyte secondary battery positive electrode active material according to any one of (1) to (3).

Effects of the Invention

By the lithium-manganese-nickel complex oxide of the present invention, a positive electrode active material of particles having an extremely low proportion of ungrown particles and high crystallinity is obtained, dissolution of manganese in the battery is suppressed, and excellent cycle characteristics are exhibited.

PREFERRED MODE FOR CARRYING OUT THE INVENTION

Figure 1:
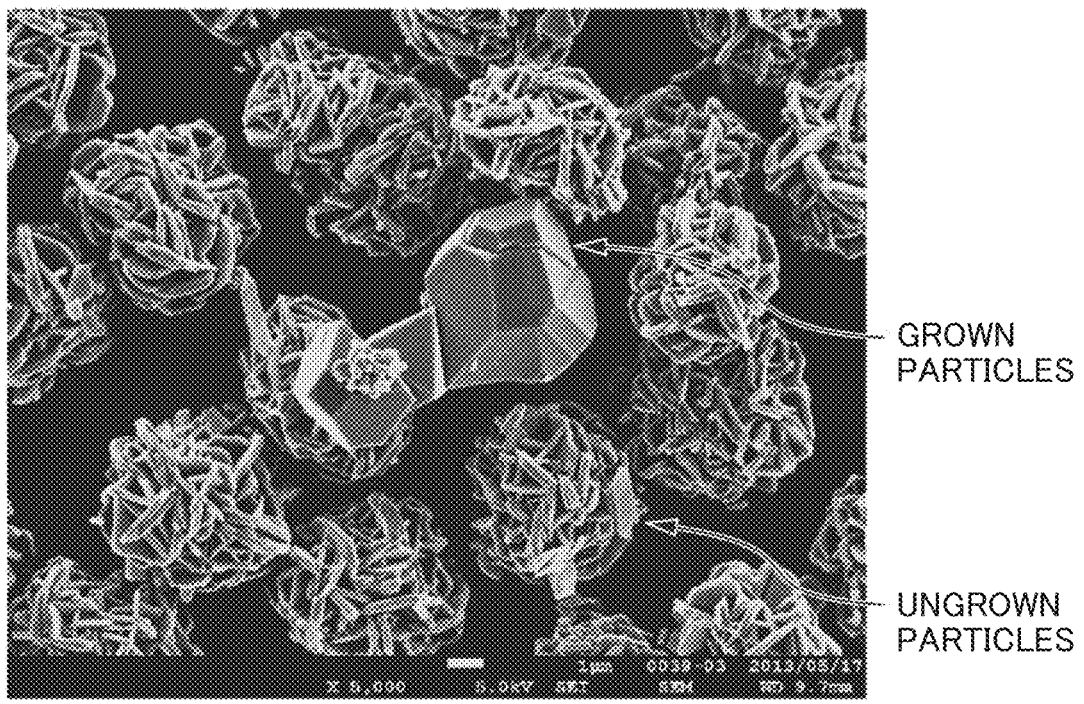
FIG. 1 is a SEM photograph illustrating the shape of ungrown particles.

Hereinafter, specific embodiments (hereinafter referred to as the "present embodiment") of the present invention will be described in detail in the following order. Incidentally, the present invention is not limited to the following embodiments at all and can be implemented with appropriate modification within the scope of the object of the present invention.

1. Nonaqueous Electrolyte Secondary Battery Positive Electrode Active Material
2. Method for Manufacturing Nonaqueous Electrolyte Secondary Battery Positive Electrode Active Material
3. Nonaqueous Electrolyte Secondary Battery 1. Nonaqueous Electrolyte Secondary Battery Positive Electrode Active Material The nonaqueous electrolyte secondary battery positive electrode active material (hereinafter also simply referred to as the "positive electrode active material") according to the present embodiment is formed of lithium-manganese-nickel complex oxide. The lithium-manganese-nickel complex oxide is characterized by including a spinel-type crystal structure, being formed of primary particles having a polyhedral shape having more than eight faces, and having a crystallite diameter of 1000 Å or more.

In addition, it is preferable that the atomic ratio among Li, Mn, Ni, and an arbitrary additional element M in the lithium-manganese-nickel complex oxide has a relationship of Li:Mn:Ni:M=1+x:2−y−x−z:y:z (where $0 \leq x \leq 0.2$, $0.4 \leq y \leq 0.6$, $0 \leq z \leq 0.2$, and M is one or more selected from the group consisting of Mg, Al, Si, Ti, Cr, Fe, Co, Cu, and Zn).

Incidentally, it is possible to contain an additional element M in the lithium-manganese-nickel complex oxide in a predetermined amount in addition to Li, Mn, and Ni in this manner.

Here, in the lithium-manganese-nickel complex oxide forming the positive electrode active material, the atomic ratio of Li to other metals can be changed by changing the ratio of the metal sources of starting materials added. Meanwhile, when the Li source is added at a ratio to be higher than the above-mentioned stoichiometric ratio as the ratio of the metal sources added, Li is introduced into sites of other metals to improve the stability of the crystal but the capacity of the battery does not change since Li itself is a metal which is not involved in oxidation and reduction. Hence, a decrease in capacity is led as Li is introduced in a large amount as a result. Consequently, the value of "x" in the atomic ratio among Li, Mn, Ni, and additional element M is 0.2 or less and preferably less than 0.1.

In the same manner, it is also possible to change the amount of Ni doped to Mn represented by "y" in the atomic ratio among Li, Mn, Ni, and additional element M. The doped amount is 0.4 or more and 0.6 or less and preferably 0.45 or more and 0.55 or less. The charge-discharge capacity at which a potential of 5 V class is expressed decreases when the amount of Ni doped is out of this range.

In the case of containing an additional element M, the element M can be appropriately selected depending on the application of and performance required to the secondary battery formed by using the positive electrode active material and it is possible to use, for example, at least one element selected from the group consisting of magnesium (Mg), aluminum (Al), silicon (Si), titanium (Ti), chromium (Cr), iron (Fe), cobalt (Co), copper (Cu), and zinc (Zn).

In addition, there are some elements M which do not contribute to the oxidation-reduction reaction of the positive electrode active material, and thus the value of "z" indicating the amount of the element M added in the atomic ratio among Li, Mn, Ni, and the element M is 0.20 or less, preferably 0.15 or less, and more preferably 0.10 or less from the viewpoint of the characteristics of the secondary battery formed of the positive electrode active material.

Incidentally, the stoichiometric ratio of oxygen is not required to be strictly 4 of the stoichiometric ratio. In the lithium-manganese-nickel complex oxide, oxygen defects are actually generated by the synthesis conditions and the influence of additional elements but the stoichiometric ratio of oxygen is smaller than 4 because of such defects and the like.

At least a peak attributable to the diffraction pattern of $LiMn_2O_4$ having a spinel-type crystal structure by the space group Fd-3m or P4332 is observed in the diffraction pattern to be obtained by the evaluation of the lithium-manganese-nickel complex oxide having the composition as described above using XRD. Peaks derived from crystal structures other than this may be detected as long as the battery characteristics are not finally significantly affected.

Figure 3:
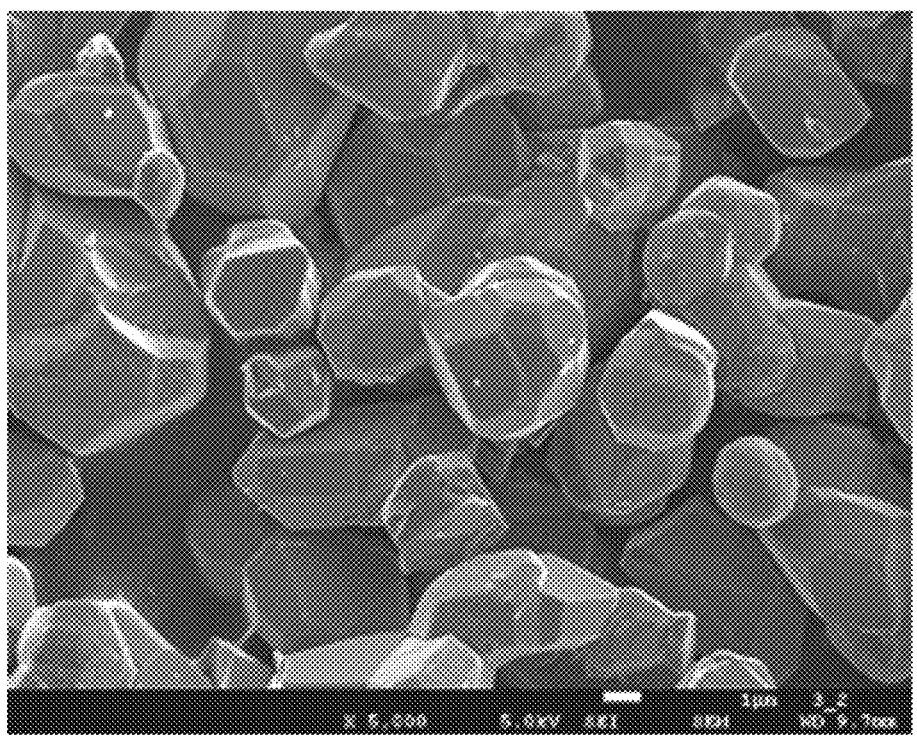
FIG. 3 is a SEM photograph of particles of lithium-manganese-nickel complex oxide after recalcination obtained in Example 1.

In addition, the lithium-manganese-nickel complex oxide according to the present embodiment is formed of primary particles having a polyhedral shape having more than eight faces (see the SEM photograph of FIG. 3). Here, for example, the particle shape of a general spinel-type lithium-manganese-nickel oxide as to be synthesized by a liquid phase method such as a crystallization method is an octahedral particle having the (111) plane as the only exposed face. Moreover, Mn is more likely to dissolve through this (111) plane as compared to other exposed faces. Hence, the cycle characteristics of the secondary battery using this octahedral particle having the (111) plane as the only exposed face as the positive electrode active material decrease. On the contrary, it is possible to relatively decrease the proportion of the (111) plane to the total surface area in the case of particles having a crystal plane exposed other than the (111) plane and a polyhedral shape having more than eight faces, and this makes it possible to suppress the dissolution of Mn and to improve the cycle characteristics.

In addition, the lithium-manganese-nickel complex oxide according to the present embodiment has a crystallite diameter of 1000 Å or more. When the crystallite diameter is smaller than 1000 Å, the dissolution of a large amount of Mn occurs, the cycle characteristics of the secondary battery using this lithium-manganese-nickel complex oxide as a positive electrode active material decrease, and a decrease in capacity is also caused since the insertion and detachment of lithium ions at the time of charging and discharging is not easily conducted. Incidentally, the "crystallite diameter" refers to a crystallite diameter determined by the Scherrer method based on the full width at half maximum of the peak of the (311) plane in the X-ray diffraction (XRD) pattern measured by X'Pert PROMRD manufactured by PANALYTICAL.

In addition, the proportion of ungrown particles contained in the lithium-manganese-nickel complex oxide according to the present embodiment is 5% or less. Here, the "ungrown particles" are a particle of which the crystal structure is not sufficiently developed and can be defined as irregularly shaped particles which have a look of a plate-like crystal, for example, illustrated in a part of FIG. 1 as the look of appearance and of which the primary particles do not have a polyhedral shape. The proportion of these ungrown particles is determined by, for example, observing the lithium-manganese-nickel complex oxide to be used as the positive electrode active material under a scanning electron microscope (SEM) at a magnification at which 100 or more particles are observed in one field of vision, counting the number of particles and the number of ungrown particles in this one field of vision, and calculating the proportion of the ungrown particles from these numbers. For example, in a case in which the number of entire particles in one field of vision is 125 and the number of ungrown particles among them is 25, the proportion of the ungrown particles is 20%. The crystal structure of such ungrown particles is not sufficiently developed as compared to the grown particles, the specific surface area thereof is larger than that of the grown particles, and the reactivity with the electrolytic solution increases, and thus the amount of Mn dissolved increases and the cycle characteristics of the secondary battery using the lithium-manganese-nickel complex oxide containing these ungrown particles as a positive electrode active material decrease.

2. Method for Manufacturing Nonaqueous Electrolyte Secondary Battery Positive Electrode Active Material The positive electrode active material according to the present embodiment is formed of lithium-manganese-nickel complex oxide (hereinafter also simply referred to as the "complex oxide") as described above. The method for manufacturing this lithium-manganese-nickel complex oxide is characterized by including a crystallization step, a calcination step, and a recalcination step. Hereinafter, the respective steps will be specifically described.

(1) Crystallization Step

The crystallization step is a step of obtaining manganese-nickel complex hydroxide (hereinafter also simply referred to as the "complex hydroxide") represented by a general formula of $Mn_{1-x}Ni_xOH$ (where $0.2 \leq x \leq 0.3$) from a mixed solution of manganese chloride and nickel chloride by a crystallization reaction.

In the crystallization step, manganese-nickel complex hydroxide is produced by using manganese chloride and nickel chloride, which are chloride salts, as the manganese source and the nickel source. By this, the primary particles of lithium-manganese-nickel complex oxide to be obtained by calcining the manganese-nickel complex hydroxide can have a specific shape, the crystallinity of the lithium-manganese-nickel complex oxide is enhanced, and ungrown particles are hardly present in the lithium-manganese-nickel complex oxide.

Here, for example, it is conceivable to conduct reactive crystallization by using a sulfate salt as a metal source other than the chloride salt, but the sulfate ion present in the complex hydroxide inhibits the crystal growth at the time of calcination when lithium-manganese-nickel complex oxide is manufactured by mixing a complex hydroxide obtained by using a sulfate salt and a lithium compound and calcining the mixture. Hence, the crystal growth of particles does not sufficiently proceed, and as a result, a nonuniform state in which grown particles and ungrown particles are mixed in the particles is obtained. On the contrary, a sulfate ion which inhibits the crystal growth at the time of calcination is not present in the complex hydroxide by using manganese chloride and nickel chloride which are chloride salts, and thus the crystallinity can be enhanced and the growth of particles uniformly proceeds. In addition, the chlorine component exhibits a flux action at the time of calcination and the crystal growth can thus more effectively proceed. This makes it possible to obtain uniform and highly crystalline particles even at a low calcination temperature.

In the crystallization step, first, a mixed aqueous solution of manganese chloride and nickel chloride is prepared so that the atomic ratio of manganese to nickel in the aqueous solution is substantially the atomic ratio of manganese to nickel in the intended composition. Subsequently, the mixed aqueous solution and an alkali aqueous solution for adjusting the pH are simultaneously and continuously put into a reaction tank, the temperature of the mixed solution in the reaction tank is maintained preferably in a range of 30° C. or higher to 80° C. or lower and the pH thereof is maintained preferably in a range of 10.5 or more to 12.5 or less, and the crystallization reaction is conducted. At this time, it is preferable to conduct the crystallization reaction while stirring the mixture by using a stirring blade of a stirrer so that the precipitate does not accumulate in the bottom of the tank and the particles of the precipitate stably grow. The concentration of slurry in the reaction tank is in a steady state as the amount of the mixed aqueous solution to be put into the reaction tank, the amount of precipitate produced, and the amount of precipitate collected by being removed from the reaction tank as overflow are constant. Thereafter, the collected precipitate is filtered and washed with water to obtain spherical or pseudospherical manganese-nickel complex hydroxide particles.

In the case of adding the element M to the positive electrode active material in the crystallization step, it is possible to add a water-soluble compound (for example, a metal salt) of the element M to the mixed solution as a metal source of the element M so as to have the same composition as that of the final product. The amount of the element M contained in the positive electrode active material is smaller than that of Mn, Ni, or the like, and it is thus possible to use a sulfate salt, a nitrate salt, an oxoate salt, or the like in addition to a chloride having a high solubility in water. In addition, after the manganese-nickel complex hydroxide particles which do not contain the element M are once crystallized, a compound of the element M can be added thereto. The method for adding the element M is not particularly limited, and, for example, it is possible to add an aqueous solution of a compound of the M element and an alkali aqueous solution to the surface of the manganese-nickel complex hydroxide particles and to deposit the compound of the element M on the surface of the manganese-nickel complex hydroxide particles. In addition, it is possible to mix fine particles containing the element M with the manganese-nickel complex hydroxide particles. The amount of the element M added is set so as to have the same composition ratio as that in the intended lithium-manganese-nickel complex oxide.

In addition, in the crystallization step, ammonia water can be added as a complexing agent together with the mixed aqueous solution containing manganese chloride and nickel chloride and the alkali aqueous solution. In addition, in order to control the atmosphere in the reaction tank, it is also possible to circulate the air, nitrogen gas, or the like in the reaction tank.

The alkali aqueous solution for pH adjustment is not particularly limited as long as it does not contain impurities to cause a problem by being mixed when the complex oxide is used as a positive electrode active material and it is possible to use, for example, a sodium hydroxide solution, a potassium hydroxide solution, and the like.

The reaction temperature is not particularly limited, but it is preferable to adjust the reaction temperature to be in a range of 30° C. or higher and 80° C. or lower. When the reaction temperature is lower than 30° C., the solubility of manganese chloride and nickel chloride does not sufficiently increase and there is a possibility that a difference between the composition of the starting materials added and the composition of manganese-nickel complex hydroxide to be obtained is caused. On the other hand, it is not industrially preferable that the reaction temperature is higher than 80° C. since excessive energy is required for maintaining the temperature.

It is preferable to adjust the pH in the reactive crystallization to be in a range of 10.5 or higher and 12.5 or lower. When the pH is lower than 10.5, the solubility of manganese chloride and nickel chloride does not sufficiently increase and there is a possibility that a difference between the composition of the starting materials added and the composition of manganese-nickel complex hydroxide to be obtained is caused. On the other hand, it is not industrially preferable that the pH is higher than 12.5 since an excessive alkali aqueous solution is used and the volume of the reaction tank required in surplus increases.

(2) Calcination Step

The calcination step is a step of obtaining lithium-manganese-nickel complex oxide by mixing the manganese-nickel complex hydroxide obtained in the crystallization step with a lithium compound and calcining the lithium mixture thus obtained.

In the calcination step, first, the manganese-nickel complex hydroxide obtained in the crystallization step and a lithium compound are mixed together by using a shaker mixer, a stirring mixer, a rocking mixer, or the like so as to have a metal composition of the intended complex oxide. Subsequently, the powder (lithium mixture) obtained by mixing is calcined in a temperature range of 800° C. or higher and 1000° C. or lower in an oxygen atmosphere or an air atmosphere for a treatment time of 10 hours or longer and 20 hours or shorter to obtain lithium-manganese-nickel complex oxide.

The lithium compound is not particularly limited as long as it does not contain impurities to cause a problem by being mixed when the complex oxide is used as a positive electrode active material and examples thereof may include lithium carbonate, lithium hydroxide, and lithium acetate.

In the calcination step, in the case of adding an element M to the positive electrode active material, a compound containing the element M can be added to the manganese-nickel complex hydroxide or the lithium mixture so as to have the same composition ratio as that in the intended lithium-manganese-nickel complex oxide. The compound containing the element M is not particularly limited, and it is possible to use, for example, an oxide, a hydroxide, a carbonate of the element M, a mixture thereof, or the like.

The calcination temperature is adjusted to 800° C. or higher and 1000° C. or lower. In the present embodiment, a chloride salt is used as the metal salt which is a starting material of manganese-nickel complex hydroxide and a highly crystalline complex oxide can be thus obtained even at such a relatively low calcination temperature. When the calcination temperature is lower than 800° C., manganese, nickel, and lithium of metal elements do not sufficiently thermally diffuse in the particles being calcined and the chemical composition is thus likely to be nonuniform. In addition, it is not preferable that the calcination temperature is lower than 800° C. since the proportion of ungrown particles increases, thus particles having poor crystallinity and a large specific surface area are obtained, further the amount of manganese dissolved increases, and the cycle characteristics of the secondary battery using the complex oxide thus obtained as a positive electrode active material decrease. On the other hand, it is not preferable that the calcination temperature is higher than 1000° C. since partial sintering of primary particles occurs and secondary particles are also coarsened. Furthermore, it is not industrially preferable that the calcination temperature is higher than 1000° C. since the equipment investment cost of the kiln capable of withstanding such a high calcination temperature increases and a large amount of energy is consumed.

As the calcination time, the calcination is conducted for 10 hours or longer and 20 hours or shorter. It is not preferable that the calcination time is shorter than 10 hours since manganese, nickel, and lithium of metal elements do not sufficiently thermally diffuse and the chemical composition is nonuniform. On the other hand, it is not industrially preferable that the calcination time is longer than 20 hours since not only the effect corresponding to heating is not obtained but also energy is consumed for heating. Furthermore, it is also concerned that oxygen defects are generated.

(3) Recalcination Step

The recalcination step is a step of subjecting the lithium-manganese-nickel complex oxide obtained in the calcination step to a recalcination treatment.

In the recalcination step, recalcination of the lithium-manganese-nickel complex oxide obtained in the calcination step is conducted at a temperature condition of 500° C. or higher and 800° C. or lower for 5 hours or longer and 40 hours or shorter. By the treatment in this recalcination step, it is possible to improve the oxygen defects and lattice strain present in the lithium-manganese complex oxide before calcination and to effectively produce particles having a crystallite diameter of 1000 Å or more by improvement in crystallinity.

The recalcination temperature is set to be lower than the calcination temperature in the reaction with lithium, and specifically, it is set to a temperature of 500° C. or higher and 800° C. or lower. In addition, the recalcination is conducted by adjusting the temperature preferably to 600° C. or higher and 800° C. or lower. A sufficient crystallinity improving effect is not obtained when the calcination temperature is lower than 500° C. On the other hand, when the calcination temperature is higher than 800° C., oxygen defects are generated and the crystallinity of the complex oxide thus deteriorates.

The recalcination time is set to 5 hours or longer and 40 hours or shorter. In addition, the recalcination is conducted by setting the time to preferably 10 hours or longer and 40 hours or shorter and more preferably 20 hours or longer and 40 hours or shorter. It is impossible to sufficiently decrease the oxygen defects when the recalcination time is shorter than 5 hours. On the other hand, it is not industrially preferable that the recalcination time is longer than 40 hours since not only the effect corresponding to heating is not obtained but also energy is consumed for heating.

Incidentally, it is possible to include steps such as classification in addition to the steps described above if necessary.

3. Nonaqueous Electrolyte Secondary Battery

The nonaqueous electrolyte secondary battery includes a positive electrode having a positive electrode active material, a negative electrode, a separator, and a nonaqueous electrolytic solution. Incidentally, the embodiment to be described below is merely an example, and this nonaqueous electrolyte secondary battery can be implemented in various modified and improved forms based on the embodiment described in the present specification and the knowledge of those skilled in the art. In addition, the following description does not particularly limit the application of this nonaqueous electrolyte secondary battery.

(1) Positive Electrode

The positive electrode is composed of, for example, a positive electrode active material and a current collector coated with a positive electrode mixture containing the positive electrode active material. In the present embodiment, a positive electrode active material containing lithium-manganese-nickel complex oxide obtained by mixing and calcining the manganese-nickel complex hydroxide described above and a lithium compound is used as the positive electrode active material.

The positive electrode can be fabricated, for example, in the following manner by using a positive electrode active material. Incidentally, the method for fabricating the positive electrode is not limited to the following method, and the positive electrode may be fabricated by another method.

First, a powdery positive electrode active material containing lithium-manganese-nickel complex oxide, a conductive material, and a binder are mixed together, an intended solvent such as activated carbon or viscosity control is further added to the mixture if necessary, and this mixture is kneaded to fabricate a positive electrode mixture paste. The mixing ratio among the respective components in the positive electrode mixture paste is appropriately selected depending on the application of and performance required to the secondary battery and is not particularly limited, but it is possible to set the content of the positive electrode active material to 60 parts by mass or more and 95 parts by mass or less, the content of the conductive material to 1 part by mass or more and 20 parts by mass or less, and the content of the binder to 1 part by mass or more and 20 parts by mass or less when the solid components in the positive electrode mixture excluding the solvent is set to 100 parts by mass in the same manner as in the positive electrode of a general nonaqueous electrolyte secondary battery.

Next, the positive electrode mixture paste thus obtained is applied on the surface of a current collector made of an aluminum foil, for example, and dried to scatter the solvent. In addition, the resultant can be pressurized by a roll press or the like in order to increase the electrode density if necessary. By such an operation, a sheet-like positive electrode can be fabricated. Incidentally, the sheet-like positive electrode can be cut or the like into a proper size depending on the size of the intended battery and used in the fabrication of the battery.

The conductive material is not particularly limited, and it is possible to use, for example, graphite (natural graphite, artificial graphite, expanded graphite, and the like) and carbon black-based materials such as acetylene black and Ketjen black (registered trademark).

The binder is not particularly limited as long as it serves a function to bind the active material particles, and it is possible to use, for example, polyvinylidene fluoride (PVDF), polytetrafluoroethylene (PTFE), fluororubber, ethylene propylene diene rubber, styrene butadiene, a cellulose-based resin, and polyacrylic acid.

In addition, it is also possible to add a solvent to the positive electrode mixture in order to disperse the positive electrode active material, the conductive material, and the activated carbon and to dissolve the binder. The solvent is not particularly limited, but it is possible to use, for example, an organic solvent such as N-methyl-2-pyrrolidone. In addition, it is possible to add activated carbon to the positive electrode mixture in order to increase the capacity of electric double layer.

(2) Negative Electrode

As the negative electrode, it is possible to use one formed by coating the surface of a current collector made of a metal foil such as copper with a negative electrode mixture obtained by mixing a binder with metal lithium, a lithium alloy, or the like, or a negative electrode active material capable of occluding and detaching lithium ions, adding a proper solvent to the mixture, and forming the mixture into a paste, drying the negative electrode mixture, and, if necessary, compressing the resultant in order to increase the electrode density.

The negative electrode active material is not particularly limited, and it is possible to use, for example, natural graphite, artificial graphite, a calcined body of an organic compound such as a phenolic resin, or a powdered body of a carbon substance such as coke. In addition, a fluorine-containing resin such as PVDF can be used as the binder of negative electrode in the same manner as in the positive electrode. In addition, an organic solvent such as N-methyl-2-pyrrolidone can be used as a solvent for dispersing these negative electrode active material and binder.

(3) Separator

A separator is disposed to be sandwiched between the positive electrode and the negative electrode. The separator separates the positive electrode and the negative electrode from each other and holds the electrolyte, and it is possible to use a thin film, such as polyethylene or polypropylene, having a large number of minute holes.

(4) Nonaqueous Electrolytic Solution

The nonaqueous electrolytic solution is obtained by dissolving a lithium salt as a supporting salt in an organic solvent.

The organic solvent is not particularly limited, examples thereof may include cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate, and these can be used singly or in admixture of two or more kinds thereof.

The supporting salt is not particularly limited, and it is possible to use, for example, $LiPF_6$, $LiBF_4$, $LiClO_4$, $LiAsF_6$, $LiN(CF_3SO_2)_2$, and any complex salt thereof.

Incidentally, although it is not an essential aspect, it is possible to contain a radical scavenger, a surfactant, a flame retardant, and the like in the nonaqueous electrolytic solution in order to improve battery characteristics.

(5) Shape and Configuration of Battery

The shape of the nonaqueous electrolyte secondary battery is not particularly limited, and for example, it can be various shapes such as a cylindrical shape and a laminated shape.

Regardless of the shape, the positive electrode and the negative electrode are laminated via the separator to obtain an electrode body and the electrode body thus obtained is impregnated with the nonaqueous electrolytic solution. Thereafter, the current collector of positive electrode and the positive electrode terminal to communicate with the exterior are connected to each other by using a current collecting lead and the current collector of negative electrode and the negative electrode terminal to communicate with the exterior are connected to each other by using a current collecting lead, respectively, and these are sealed in a battery case. In this manner, a nonaqueous electrolyte secondary battery can be fabricated.

(6) Characteristics

In the present embodiment, the lithium-manganese-nickel complex oxide particles described above are used as the positive electrode active material, and the nonaqueous electrolyte secondary battery formed of such a positive electrode active material has a high capacity and high cycle characteristics.

(7) Application of Nonaqueous Electrolyte Secondary Battery

Such a nonaqueous electrolyte secondary battery has the characteristics as described above, and it can be thus suitably used as a power source for small portable electronic devices (laptop personal computers, cellular phone terminals, and the like) which always require a high capacity. In addition, this nonaqueous electrolyte secondary battery is also suitable as a power source for electric vehicle to be mounted in a restricted space since it can be miniaturized and have a high output.

Incidentally, this nonaqueous electrolyte secondary battery can be used not only as a power source for electric vehicle driven purely by electric energy but also as a power source for a so-called hybrid vehicle to be concurrently used with a combustion engine such as a gasoline engine or a diesel engine.

EXAMPLES

Hereinafter, the present invention will be described more specifically with reference to Examples, but the present invention is not limited to the following Examples at all.

Example 1

[Fabrication of Lithium-Manganese-Nickel Complex Oxide]

While adding a mixed stock solution (Mn:Ni=3:1 in molar ratio of metal elements) prepared by dissolving hydrate crystals of nickel chloride and manganese chloride in pure water and ammonia water into a reaction tank containing pure water previously heated to 40° C. dropwise at a prescribed flow rate, an aqueous solution of sodium hydroxide was further added into the reaction tank dropwise to maintain the pH at 11.5. This made it possible to crystallize nickel-manganese complex hydroxide of a precursor and to obtain a slurry. Next, the complex hydroxide thus obtained was filtered and dried to obtain a powder. This powder and lithium carbonate were mixed by using Turbula Shaker Mixer (T2F, manufactured by Dalton Co., Ltd.). At this time, the amount of lithium carbonate added was set to ½ equivalent of the total number of atoms of nickel and manganese contained in the complex hydroxide to be mixed in terms of the number of Li atoms.

Next, the atmosphere was set to the air atmosphere, the calcination was conducted by keeping the mixture at 1000° C. for 12 hours in an atmosphere kiln (model number: HAF-2020S, manufactured by HIROCHIKU CO., LTD.). The lithium-manganese-nickel complex oxide before recalcination obtained by this calcination was subjected to the measurement by an XRD (X'Pert PROMRD, manufactured by PANALYTICAL), the crystallite diameter thereof was calculated by the Scherrer method, and the crystallite diameter was 2261 Å.

Thereafter, the lithium-manganese-nickel complex oxide after being cooled was further kept at 700° C. for 36 hours in an atmosphere kiln (model number: HAF-2020S, manufactured by HIROCHIKU CO., LTD.) for recalcination, thereby obtaining lithium-manganese-nickel complex oxide.

The composition ratio of the respective components in the lithium-manganese-nickel complex oxide thus obtained was chemically analyzed by inductively coupled plasma (ICP) atomic emission spectrophotometry (VARIAN, 725ES). The results are presented in Table 1.

Figure 4:
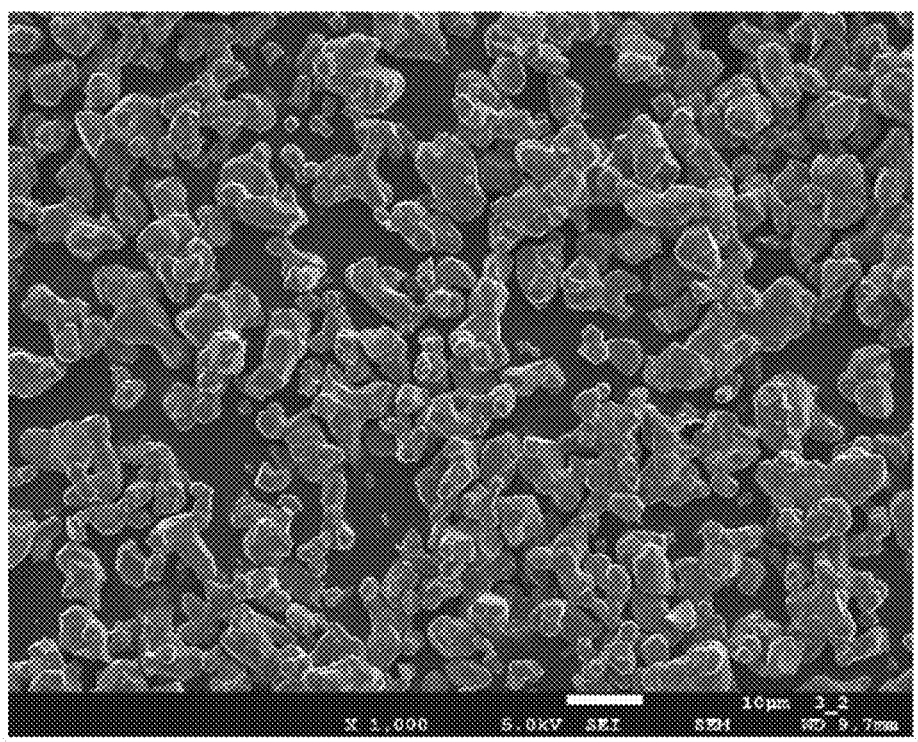
FIG. 4 is a SEM photograph of particles of lithium-manganese-nickel complex oxide after recalcination obtained in Example 1 at a magnification at which 100 or more particles can be observed in one field of vision.

Next, the lithium-manganese-nickel complex oxide thus obtained was observed under a SEM (JSM-7001F, manufactured by JEOL Ltd.) to confirm the shape and uniformity of the particles. A SEM photograph is illustrated in FIG. 3. As can be seen from the SEM photograph of FIG. 3, the shape of the particles of the complex oxide thus obtained was a polyhedron having more than eight faces. In addition, as an index of the evaluation on uniformity in particle growth, SEM observation was conducted at a magnification at which 100 or more particles were able to be observed in one field of vision as illustrated in FIG. 4 and the proportion of the number of ungrown particles to the number of total particles was calculated. As a result, the proportion of ungrown particles was 0%.

Figure 5:
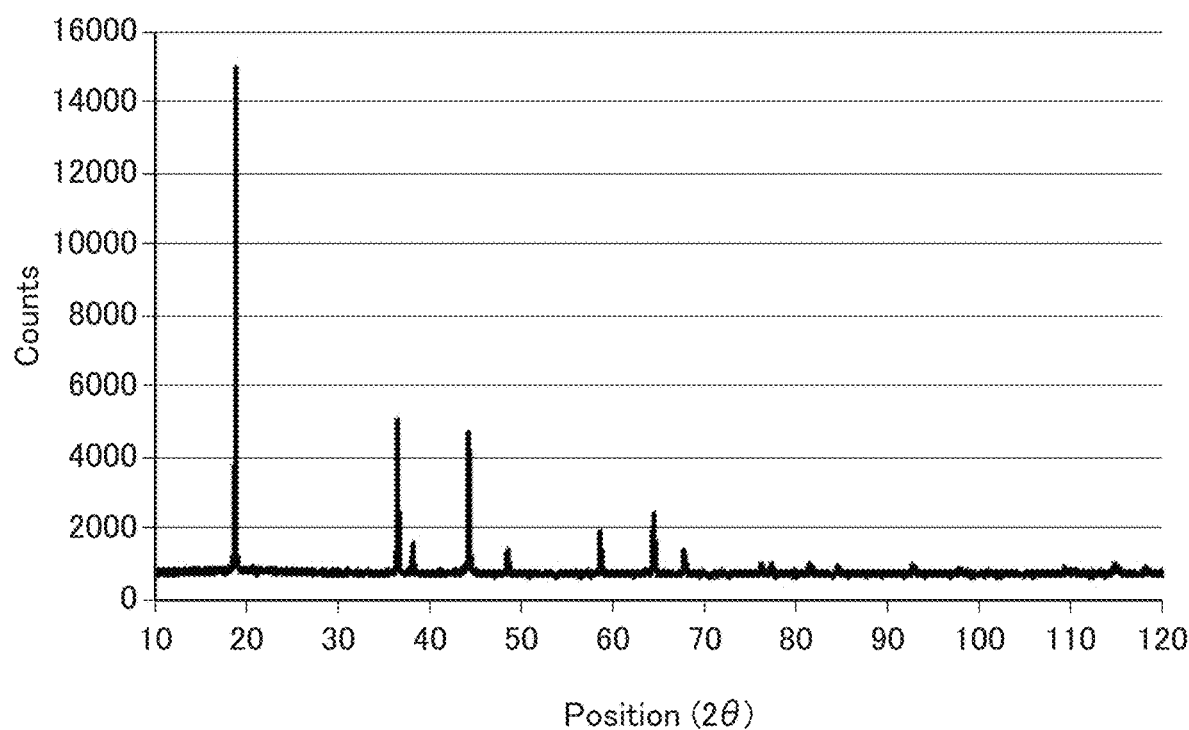
FIG. 5 is an XRD pattern of lithium-manganese-nickel complex oxide after recalcination obtained in Example 1.

Next, the lithium-manganese-nickel complex oxide after recalcination thus obtained was subjected to the measurement by an XRD. The results are illustrated in FIG. 5. As illustrated in FIG. 5, a peak of $LiMn_2O_4$ having a spinel-type crystal structure by the space group Fd-3m was detected. The peak position of the (311) plane was 36.45° by 2θ. In addition, the crystallite diameter was calculated by the Scherrer method and the crystallite diameter was 3182 Å.

[Manufacture and Evaluation of Secondary Battery]

Figure 2:
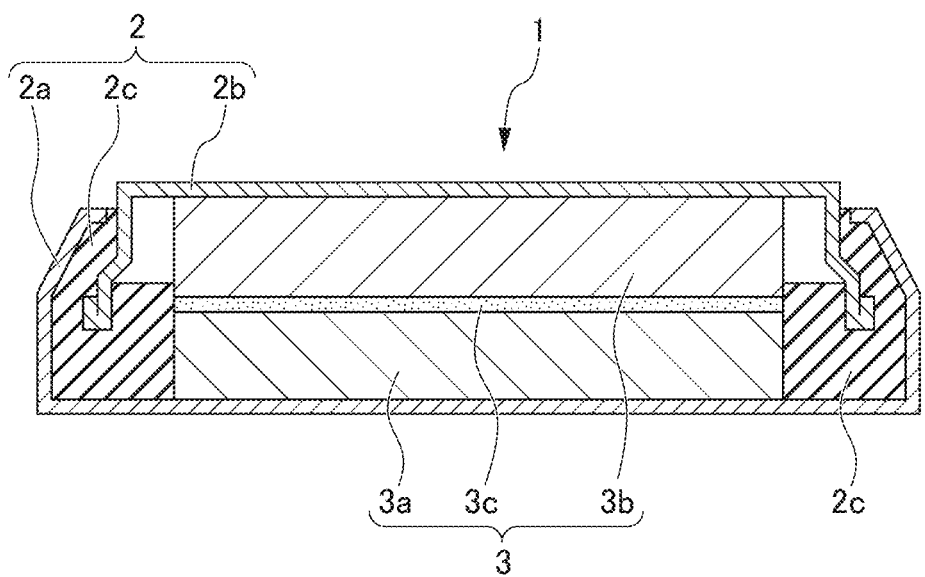
FIG. 2 is a schematic cross-sectional view of a 2032 type coin battery.

For evaluation of the lithium-manganese-nickel complex oxide thus obtained as a positive electrode active material, a 2032 type coin battery 1 (hereinafter referred to as the "coin type battery") was fabricated. Incidentally, the structure of the coin type battery will be described with reference to the schematic configuration view of FIG. 2.

The coin type battery 1 is composed of a case 2 and an electrode 3 accommodated in the case 2. The case 2 has a positive electrode can 2a which is hollow and open at one end and a negative electrode can 2b to be disposed at the opening of the positive electrode can 2a, and a space for accommodating the electrode 3 is formed between the negative electrode can 2b and the positive electrode can 2a when the negative electrode can 2b is disposed at the opening of the positive electrode can 2a. In addition, the electrode 3 is composed of a positive electrode 3a, a separator 3c, and a negative electrode 3b, and these are laminated so as to be aligned in this order, and the electrode 3 is accommodated in the case 2 so that the positive electrode 3a is in contact with the inner surface of the positive electrode can 2a and the negative electrode 3b is in contact with the inner surface of the negative electrode can 2b. Incidentally, the case 2 is provided with a gasket 2c, and the relative movement is fixed by the gasket 2c so that a noncontact state between the positive electrode can 2a and the negative electrode can 2b is maintained. In addition, the gasket 2c also has a function to seal the gap between the positive electrode can 2a and the negative electrode can 2b and to shield the space between the inside and the outside of the case 2 in an airtight and liquid-tight manner.

Such a coin type battery 1 was fabricated as follows.

First, 52.5 mg of the lithium-manganese-nickel complex oxide thus obtained, 15 mg of acetylene black, and 7.5 mg of polytetrafluoroethylene resin (PTFE) were mixed together, and the mixture was thinned until to have a weight of about 10 mg at a diameter of 10 mm, thereby fabricating the positive electrode 3a, and this was dried at 120° C. for 12 hours in a vacuum dryer.

Next, the coin type battery 1 was fabricated by using the positive electrode 3a in a glove box in an Ar atmosphere of which the dew point was controlled at −80° C. At this time, a lithium foil punched into a disk shape having a diameter of 14 mm or a negative electrode sheet obtained by coating a copper foil with a graphite powder having an average particle diameter of about 20 μm and polyvinylidene fluoride was used as the negative electrode 3b. In addition, a porous polyethylene film having a film thickness of 25 μm was used as the separator 3c and a 3:7 mixed solution (manufactured by TOMIYAMA PURE CHEMICAL INDUSTRIES, LTD.) of ethylene carbonate (EC) and diethyl carbonate (DEC) containing 1 M $LiPF_6$ as a supporting electrolyte was used as the electrolytic solution, respectively.

The initial discharge capacity and cycle characteristics indicating the performance of the coin type battery 1 were evaluated as follows.

In other words, with regard to the initial discharge capacity, the capacity when the battery was charged to a cut-off voltage of 5.0 V by setting the current density with respect to the positive electrode at 0.1 $mA/cm^2$ after the open circuit voltage (OCV) was stabilized by leaving the coin type battery 1 to stand for about 24 hours after fabrication, 1 hour of pause was taken, and the battery was then discharged to a cut-off voltage of 3.5 V was defined as the initial discharge capacity.

With regard to the cycle characteristics, an operation to charge the battery to a cut-off voltage of 4.9 V by setting at 0.6 $mA/cm^2$ and 60° C., to take 1 hour of pause, and then to discharge the battery to a cut-off voltage of 3.5 V was repeated 200 times, and the ratio of the discharge capacity at the 200th cycle to the discharge capacity at the second cycle was evaluated as the capacity retention.

The evaluation and measurement of battery were conducted in accordance with the above operations, and the initial discharge capacity was 142 mAh/g and the capacity retention after 200 cycles by the cycle evaluation using a carbon negative electrode was 65% as presented in the following Table 1. In addition, in order to measure the amount of Mn dissolved to be deposited on the negative electrode, the battery after being subjected to the evaluation on cycle characteristics was disassembled, the negative electrode was taken out, the amount of Mn dissolved in the negative electrode was measured, and the amount was 190 μg.

Example 2 and Example 3

In Example 2 and Example 3, lithium-manganese-nickel complex oxide was fabricated in the same manner as in Example 1 except that the calcination temperature was set to 800° C. and 900° C., respectively, a battery was fabricated by using this complex oxide as a positive electrode active material, and the evaluation thereof was conducted. The respective evaluation results are presented in the following Table 1. In addition, the lithium-manganese-nickel complex oxide after recalcination thus obtained was subjected to SEM observation, and the particle shape of the lithium-manganese-nickel complex oxide was a polyhedron having more than eight faces in both Example 2 and Example 3.

Example 4

Lithium-manganese-nickel complex oxide to which aluminum was added was fabricated by conducting the same operation as in Example 1 except that an aqueous solution prepared by dissolving hydrate crystals of nickel chloride and manganese chloride in pure water, further dissolving sodium aluminate in the solution, and adjusting the molar ratio of the metal elements to Mn:Ni:Al=3:0.9:0.1 was used as a mixed stock solution. Thereafter, a battery was fabricated by using this complex oxide as a positive electrode active material, and the evaluation thereof was conducted. The respective evaluation results are presented in the following Table 1. In addition, the lithium-manganese-nickel complex oxide after recalcination which was thus obtained and to which aluminum was added was subjected to SEM observation, and the particle shape of the lithium-manganese-nickel complex oxide to which aluminum was added was a polyhedron having more than eight faces.

Example 5

Lithium-manganese-nickel complex oxide to which titanium was added was fabricated by conducting the same operation as in Example 1 except that an aqueous solution prepared by dissolving hydrate crystals of nickel chloride and manganese chloride in pure water, adding an aqueous solution of titanium sulfate to the solution, and adjusting the molar ratio of the metal elements to Mn:Ni:Ti=2.9:1:0.1 was used as a mixed stock solution. Thereafter, a battery was fabricated by using this complex oxide as a positive electrode active material, and the evaluation thereof was conducted. The respective evaluation results are presented in the following Table 1. In addition, the lithium-manganese-nickel complex oxide after recalcination which was thus obtained and to which titanium was added was subjected to SEM observation, and the particle shape of the lithium-manganese-nickel complex oxide to which titanium was added was a polyhedron having more than eight faces.

Example 6

Lithium-manganese-nickel complex oxide to which iron was added was fabricated by conducting the same operation as in Example 1 except that an aqueous solution prepared by dissolving hydrate crystals of nickel chloride and manganese chloride in pure water, further dissolving iron sulfate in the solution, and adjusting the molar ratio of the metal elements to Mn:Ni:Fe=3:0.9:0.1 was used as a mixed stock solution. Thereafter, a battery was fabricated by using this complex oxide as a positive electrode active material, and the evaluation thereof was conducted. The respective evaluation results are presented in the following Table 1. In addition, the lithium-manganese-nickel complex oxide after recalcination which was thus obtained and to which iron was added was subjected to SEM observation, and the particle shape of the lithium-manganese-nickel complex oxide to which iron was added was a polyhedron having more than eight faces.

Example 7

Lithium-manganese-nickel complex oxide to which cobalt was added was fabricated by conducting the same operation as in Example 1 except that an aqueous solution prepared by dissolving hydrate crystals of nickel chloride and manganese chloride in pure water, further dissolving cobalt sulfate in the solution, and adjusting the molar ratio of the metal elements to Mn:Ni:Fe=2.95:0.95:0.1 was used as a mixed stock solution. Thereafter, a battery was fabricated by using this complex oxide as a positive electrode active material, and the evaluation thereof was conducted. The respective evaluation results are presented in the following Table 1. In addition, the lithium-manganese-nickel complex oxide after recalcination which was thus obtained and to which cobalt was added was subjected to SEM observation, and the particle shape of the lithium-manganese-nickel complex oxide to which cobalt was added was a polyhedron having more than eight faces.

Comparative Example 1

Figure 6:
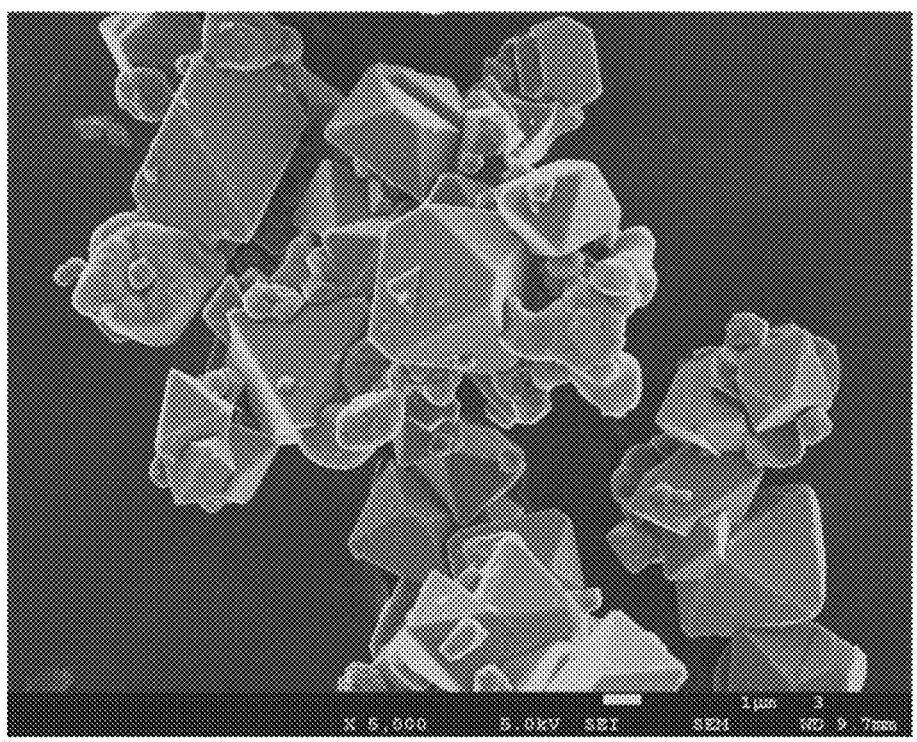
FIG. 6 is an SEM photograph of particles of lithium-manganese-nickel complex oxide after recalcination obtained in Comparative Example 1.
Figure 7:
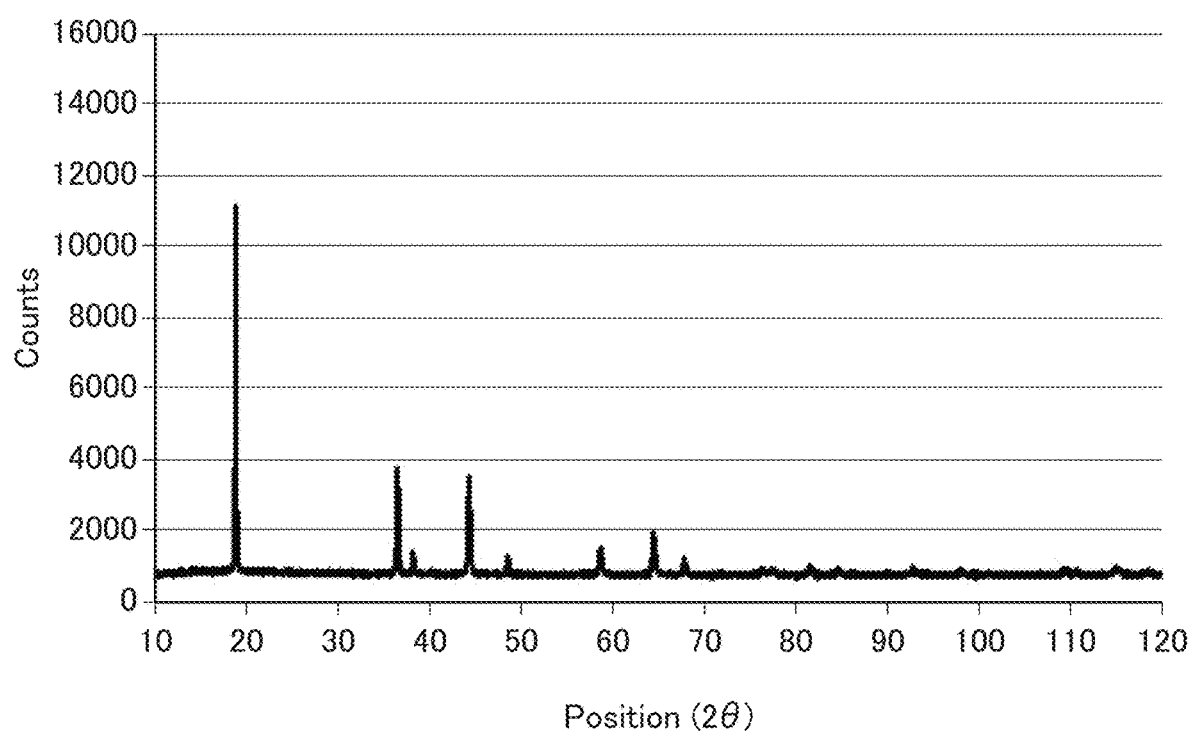
FIG. 7 is an XRD pattern of lithium-manganese-nickel complex oxide after recalcination obtained in Comparative Example 1.

In Comparative Example 1, lithium-manganese-nickel complex oxide was fabricated in the same manner as in Example 1 except that a mixed stock solution (Ni:Mn=1:3 in molar ratio of metal elements) prepared by dissolving hydrate crystals of nickel sulfate and manganese sulfate in pure water was used, a battery was fabricated by using this complex oxide as a positive electrode active material, and the evaluation thereof was conducted. The results are presented in the following Table 1. In addition, a SEM photograph of the lithium-manganese-nickel complex oxide after recalcination thus obtained is illustrated in FIG. 6. As can be seen from the SEM photograph of FIG. 6, the particle shape of the lithium-manganese-nickel complex oxide thus obtained was octahedron. In addition, the XRD pattern of the lithium-manganese-nickel complex oxide particles after recalcination obtained in Comparative Example 1 is illustrated in FIG. 7.

Comparative Example 2

Figure 8:
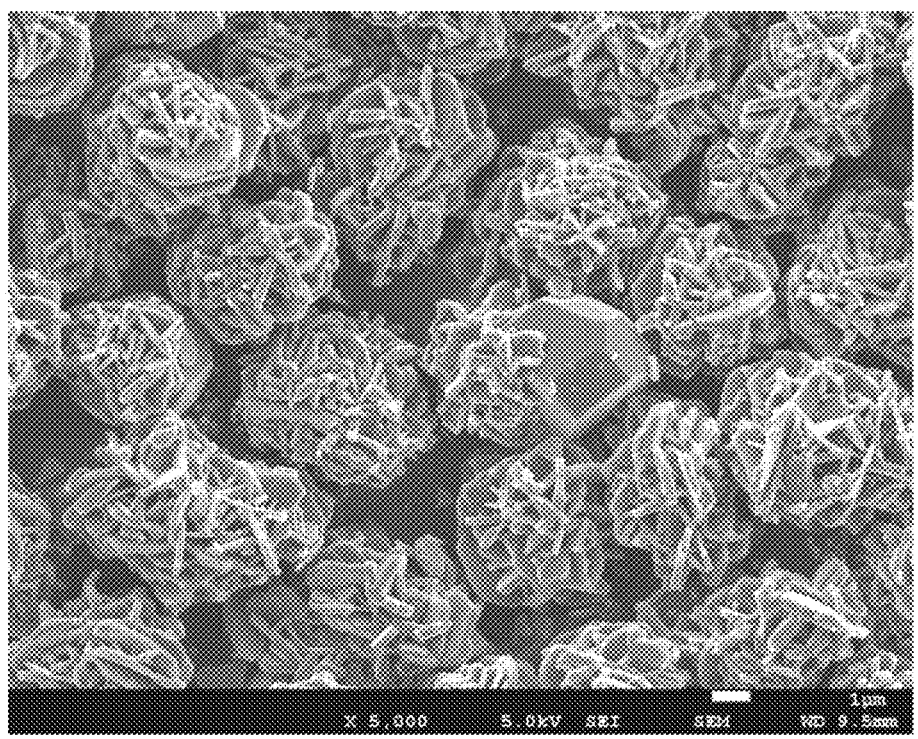
FIG. 8 is an SEM photograph of particles of lithium-manganese-nickel complex oxide after recalcination obtained in Comparative Example 2.

In Comparative Example 2, lithium-manganese-nickel complex oxide was fabricated in the same manner as in Example 1 except that a mixed stock solution (Ni:Mn=1:3 in molar ratio of metal elements) prepared by dissolving hydrate crystals of nickel sulfate and manganese sulfate in pure water was used and the calcining temperature was set to 800° C., a battery was fabricated by using this complex oxide as a positive electrode active material, and the evaluation thereof was conducted. The results are presented in the following Table 1. In addition, a SEM photograph of the lithium-manganese-nickel complex oxide after recalcination thus obtained is illustrated in FIG. 8. As can be seen from the SEM photograph of FIG. 8, most of the lithium-manganese-nickel complex oxide thus obtained was ungrown particles.

Comparative Example 3 and Comparative Example 4

In Comparative Example 3 and Comparative Example 4, lithium-manganese-nickel complex oxide was fabricated in the same manner as in Example 1 except that a mixed stock solution (Ni:Mn=1:3 in molar ratio of metal elements) prepared by dissolving hydrate crystals of nickel nitrate and manganese nitrate in pure water was used and the calcining temperature was set to 1000° C. and 800° C., respectively, a battery was fabricated by using this complex oxide as a positive electrode active material, and the evaluation thereof was conducted. The results are presented in the following Table 1. In addition, the lithium-manganese-nickel complex oxide after recalcination thus obtained was subjected to SEM observation, and the particle shape of the lithium-manganese-nickel complex oxide was octahedron in Comparative Example 3. On the other hand, a large number of the lithium-manganese-nickel complex oxide particles were ungrown particles in Comparative Example 4.

Comparative Example 5

In Comparative Example 5, lithium-manganese-nickel complex oxide was fabricated in the same manner as in Example 1 except that the calcining temperature was set to 750° C., a battery was fabricated by using this complex oxide as a positive electrode active material, and the evaluation thereof was conducted. The results are presented in the following Table 1. In addition, the lithium-manganese-nickel complex oxide after recalcination thus obtained was subjected to SEM observation, and a large number of ungrown particles were observed among the particles of the lithium-manganese-nickel complex oxide thus obtained although particles having a polyhedral shape having more than eight faces were also observed.

TABLE 1

| | Composition formula | Manganese salt | Nickel salt | Calcination temperature (° C.) | Proportion of ungrown particles (%) | Crystallite diameter (A) After calcination | Crystallite diameter (A) After recalcination | Discharge capacity (mAh/g) | Capacity retention (%) |
|---|---|---|---|---|---|---|---|---|---|
| Example 1 | $Li_1Mn_{1.501}Ni_{0.499}O_4$ | Manganese chloride | Nickel chloride | 1000 | 0 | 2261 | 3182 | 138 | 70 |
| Example 2 | $Li_1Mn_{1.499}Ni_{0.501}O_4$ | Manganese chloride | Nickel chloride | 900 | 0 | 1542 | 2099 | 137 | 67 |
| Example 3 | $Li_1Mn_{1.502}Ni_{0.498}O_4$ | Manganese chloride | Nickel chloride | 800 | 1 | 828 | 1015 | 137 | 65 |
| Example 4 | $Li_1Mn_{1.502}Ni_{0.449}Al_{0.049}O_4$ | Manganese chloride | Nickel chloride | 1000 | 3 | 2745 | 3684 | 132 | 64 |
| Example 5 | $Li_1Mn_{1.450}Ni_{0.498}Ti_{0.052}O_4$ | Manganese chloride | Nickel chloride | 1000 | 3 | 2350 | 3417 | 135 | 69 |
| Example 6 | $Li_1Mn_{1.502}Ni_{0.450}Fe_{0.048}O_4$ | Manganese chloride | Nickel chloride | 1000 | 2 | 2141 | 3270 | 137 | 75 |

TABLE 1-continued

| | Composition formula | Manganese salt | Nickel salt | Calcination temperature (° C.) | Proportion of ungrown particles (%) | Crystallite diameter (Å) After calcination | Crystallite diameter (Å) After recalcination | Discharge capacity (mAh/g) | Capacity retention (%) |
|---|---|---|---|---|---|---|---|---|---|
| Example 7 | $Li_1Mn_{1.473}Ni_{0.477}Co_{0.050}O_4$ | Manganese chloride | Nickel chloride | 1000 | 3 | 2409 | 3550 | 132 | 70 |
| Comparative Example 1 | $Li_1Mn_{1.500}Ni_{0.500}O_4$ | Manganese Sulfate | Nickel sulfate | 800 | 92 | 721 | 573 | 132 | 51 |
| Comparative Example 2 | $Li_1Mn_{1.500}Ni_{0.500}O_4$ | Manganese sulfate | Nickel sulfate | 1000 | 11 | 443 | 1010 | 138 | 60 |
| Comparative Example 3 | $Li_1Mn_{1.502}Ni_{0.498}O_4$ | Manganese nitrate | Nickel nitrate | 1000 | 6 | 954 | 1123 | 137 | 60 |
| Comparative Example 4 | $Li_1Mn_{1.502}Ni_{0.498}O_4$ | Manganese nitrate | Nickel nitrate | 800 | 77 | 568 | 689 | 133 | 53 |
| Comparative Example 5 | $Li_1Mn_{1.501}Ni_{0.499}O_4$ | Manganese chloride | Nickel chloride | 750 | 14 | 611 | 821 | 135 | 59 |

As presented in the results of Examples 1 to 3, lithium-manganese-nickel complex oxide after recalcination obtained by mixing a manganese-nickel complex hydroxide obtained by using manganese chloride and nickel chloride as metal salts of starting materials with a lithium compound and calcining the mixture was formed of primary particles having a polyhedral shape having more than eight faces and had high crystallinity to have a crystallite diameter of 1000 Å or more. In addition, the proportion of ungrown particles was also significantly low.

In addition, as presented in the results of Examples 4 to 7, lithium-manganese-nickel complex oxide after recalcination thus obtained was formed of primary particles having a polyhedral shape having more than eight faces and had high crystallinity to have a crystallite diameter of 1000 Å or more in a case in which an element other than lithium, manganese, and nickel was added to the lithium-manganese-nickel complex oxide in a predetermined amount as well. In addition, the proportion of ungrown particles was also significantly low.

It has been found that it is possible to fabricate a secondary battery having excellent cycle characteristics since a secondary battery fabricated by using such a positive electrode active material had an initial discharge capacity of 125 mAh/g or more and a discharge capacity at the 200th cycle to be 65% or more of the discharge capacity at the second cycle.

The invention claimed is:

1. A method for manufacturing a nonaqueous electrolyte secondary battery positive electrode active material formed of lithium-manganese-nickel complex oxide, the method comprising:
a crystallization step of crystallizing manganese-nickel complex hydroxide from a mixed solution of manganese chloride and nickel chloride by adding the mixed solution and an alkali aqueous solution simultaneously and continuously into a reaction tank wherein pH for the crystallization step is maintained in a range of 10.5 or more to 12.5 or less;
a calcination step of mixing the manganese-nickel complex hydroxide obtained and a lithium compound and calcining the mixture at 800° C. or higher and 1000° C. or lower to obtain lithium-manganese-nickel complex oxide; and
a recalcination step of recalcining the lithium-manganese-nickel complex oxide obtained at 500° C. or higher and 800° C. or lower for 5 hours or longer and 40 hours or shorter.

2. The method for manufacturing a nonaqueous electrolyte secondary battery positive electrode active material formed of lithium-manganese-nickel complex oxide according to claim 1, wherein the alkali aqueous solution is sodium hydroxide.

3. The method for manufacturing a nonaqueous electrolyte secondary battery positive electrode active material formed of lithium-manganese-nickel complex oxide according to claim 1, wherein temperature of the reaction tank for the crystallization step is maintained in a range of 30° C. or higher to 80° C. or lower.

4. The method for manufacturing a nonaqueous electrolyte secondary battery positive electrode active material formed of lithium-manganese-nickel complex oxide according to claim 1, wherein the mixed solution of manganese chloride and nickel chloride are prepared by dissolving nickel chloride and manganese chloride in pure water and ammonia water.

5. A method for manufacturing a nonaqueous electrolyte secondary battery positive electrode active material formed of lithium-manganese-nickel complex oxide, the method comprising:
a crystallization step of crystallizing manganese-nickel complex hydroxide from a mixed solution of manganese chloride and nickel chloride by adding the mixed solution and an alkali aqueous solution simultaneously and continuously into a reaction tank;
a calcination step of mixing the manganese-nickel complex hydroxide obtained and a lithium compound and calcining the mixture at 800° C. or higher and 1000° C. or lower to obtain lithium-manganese-nickel complex oxide; and
a recalcination step of recalcining the lithium-manganese-nickel complex oxide obtained at 500° C. or higher and 800° C. or lower for 5 hours or longer and 40 hours or shorter;
wherein the ratio of Mn and Ni (Mn:Ni) contained in the manganese-nickel complex hydroxide is in the range of 0.8:0.2 to 0.7:0.3, and
wherein pH for the crystallization step is maintained in a range of 10.5 or more to 12.5 or less.

6. The method for manufacturing a nonaqueous electrolyte secondary battery positive electrode active material formed of lithium-manganese-nickel complex oxide according to claim 5, wherein temperature of the reaction tank for the crystallization step is maintained in a range of 30° C. or higher to 80° C. or lower.

7. The method for manufacturing a nonaqueous electrolyte secondary battery positive electrode active material formed of lithium-manganese-nickel complex oxide according to claim 5, wherein the mixed solution of manganese chloride and nickel chloride are prepared by dissolving nickel chloride and manganese chloride in pure water and ammonia water.

\* \* \* \* \*